(12) United States Patent
Jang et al.

(10) Patent No.: US 7,912,029 B2
(45) Date of Patent: Mar. 22, 2011

(54) WIRELESS COMMUNICATION SYSTEM AND WIRELESS COMMUNICATION METHOD

(75) Inventors: Kyungwoon Jang, Kanagawa-ken (JP); Hirokazu Tanaka, Tokyo (JP); Shoichiro Yamasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 618 days.

(21) Appl. No.: 11/862,788

(22) Filed: Sep. 27, 2007

(65) Prior Publication Data
US 2008/0304465 A1    Dec. 11, 2008

(30) Foreign Application Priority Data

Sep. 28, 2006    (JP) .................................. 2006-265563

(51) Int. Cl.
  *H04B 7/216* (2006.01)
(52) U.S. Cl. ..................................................... 370/342
(58) Field of Classification Search .............. 370/310, 370/319, 320, 335, 342, 441, 315, 316, 203, 370/206, 328, 329
  See application file for complete search history.

(56) References Cited

U.S. PATENT DOCUMENTS

| | | | | |
|---|---|---|---|---|
| 6,359,923 B1 * | 3/2002 | Agee et al. | ..................... | 375/130 |
| 6,631,124 B1 * | 10/2003 | Koorapaty et al. | ........... | 370/337 |
| 6,888,813 B1 * | 5/2005 | Kishi | .............................. | 370/342 |
| 7,054,375 B2 * | 5/2006 | Kannan et al. | ................. | 375/260 |
| 7,092,431 B2 * | 8/2006 | Maeda et al. | .................. | 375/144 |
| 7,406,647 B2 * | 7/2008 | Lakkis | ........................... | 714/758 |
| 7,620,098 B2 * | 11/2009 | Hong et al. | ..................... | 375/150 |
| 2003/0081576 A1 * | 5/2003 | Kim et al. | ...................... | 370/335 |
| 2004/0240379 A1 * | 12/2004 | Tsuie | ............................. | 370/210 |
| 2005/0002440 A1 * | 1/2005 | Alamouti et al. | .............. | 375/141 |
| 2005/0201326 A1 * | 9/2005 | Lakkis | ........................... | 370/329 |
| 2008/0013619 A1 * | 1/2008 | Meylan et al. | ................. | 375/240 |

FOREIGN PATENT DOCUMENTS

KR    10-2001-0061738    10/2001

OTHER PUBLICATIONS

Kim et al, A Multi-Code Biorthogonal Code Keying with Constant Amplitude Coding, IEICE Trans. Commun., Jul. 2005, vol. E88-B, No. 7 pp. 2928-2936.

* cited by examiner

*Primary Examiner* — Chi H Pham
*Assistant Examiner* — Robert Lopata
(74) *Attorney, Agent, or Firm* — Turocy & Watson, LLP

(57) ABSTRACT

A wireless transceiver device employing the code select code division multiple access method includes an encoder configured to execute error correction coding on data having a predetermined number of bits among data inputted from outside, and a code selector configured to select a code corresponding to the data subjected to correction coding. The wireless transceiver device performs wireless communication by use of the data inputted from the outside excluding the data having the predetermined number of bits and by use of the code.

3 Claims, 8 Drawing Sheets

WIRELESS COMMUNICATION SYSTEM AND WIRELESS COMMUNICATION METHOD

CROSS-REFERENCE TO RELATED APPLICATIONS

This application is based upon and claims the benefit of priority from the prior Japanese Patent Application No. 2006-265563, filed on Sep. 28, 2006; the entire contents of which are incorporated herein by reference.

BACKGROUND OF THE INVENTION

1. Field of the Invention

The present invention relates to a wireless communication system used for Multi-Carrier CDMA (Code Division Multiple Access) with Code Selection method or Multi-Code CDMA with Code Selection method.

2. Description of the Related Art

It is generally understood that the orthogonal frequency division multiplexing method (OFDM) will be the next-generation fast wireless communication method. Multicode techniques or multicarrier techniques are applied to implement the fast wireless communication. However, it is pointed out that use of the multicode techniques or the multicarrier techniques makes a communication speed fast, but produces a number of problems such as a large PAPR (peak to average power ratio) or complicated signal processing for wireless communication. In particular, it is necessary to use a high-performance radio frequency (RF) circuit (a linear amplifier) when the PAPR is large.

Precisely speaking, Multi-code code division multiple access (MC-CDMA) system is known to have more capacity than the single code CDMA system so that it can transmit high speed data rates for various applications. However, the transmitting signal of MC CDMA has a high peak to average power ratio (PAPR), and a highly linear power amplifier may be required for transmission. This problem is the same to the OFDM (orthogonal frequency division multiplexing) system. So, to transmit the high PAPR signal without distortion requires more expensive power amplifier with high linearity and wider dynamic range. The impact of amplifier nonlinearity is investigated since the efficiency if high power amplifier (HPA) depends on the PAPR. Consequently, the purpose for designing a signal with low PAPR is an important problem to decrease the HPA nonlinearity and to improve the power efficiency of HPA.

The binary code division multiple access (CDMA) method configured to adjust the PAPR within a predetermined range has been proposed to deal with these problems (see Patent Document 1 (S. M. Ryu, "Code Select CDMA Modulation and Demodulation Method and Device Thereof," Korea Patent, no. 10-2001-006178, October 2001), for example). According to the modulation method used therein, this binary CDMA method can be further divided into categories of the pulse width CDMA method (hereinafter referred to as the PW/CDMA method), the multi-phase CDMA method (hereinafter referred to as the MP/CDMA method), and the code select CDMA method (hereinafter referred to as the CS/CDMA method).

The CS/CDMA method is the method configured to treat inputted data in units of multiple blocks each having a predetermined number of bits and to assign one orthogonal code to each block unit as a channel code. For this reason, unlike the PW/CDMA method or the MP/CDMA method, a phenomenon of performance deterioration attributable to mutual interference between terminals such as incapability of receiving data normally is not observed in this method.

In this CS/CDMA method, it is extremely important to reduce errors in selection of orthogonal codes at the time of data reception. This is because the selecting of one orthogonal code for multiple bits results in errors for the multiple bits, if the selected orthogonal code is an error.

To solve this serious problem, several schemes have been proposed where the PAPR of MC CDMA can be reduced with special coding techniques. In above Patent Document 1 (S. M. Ryu, "Code Select CDMA Modulation and Demodulation Method and Device Thereof," Korea Patent, no. 10-2001-006178, October 2001), a new CDMA concept called Binary CDMA has been proposed to obtain constant amplitude signal. Binary CDMA is classified into Pulse Width (PW) CDMA where the multilevel signals are converted into pulse width, Multi Phase (MP) CDMA where the multilevel signals are converted into phases, and Code Select (CS) CDMA where the multilevel signals have multi-code characteristics by selecting a code without truncation. The advantage of these schemes is that PAPR is reduced since fewer codes are used in the linear sum compared with the conventional multi-code CDMA. However, the orthogonal characteristics of the signal are weakened by truncation, and there causes a performance degradation in PW CDMA system and MP CDMA system. Also, performance of CS CDMA system is depended on detection error due to signal distortion. Therefore, the CS CDMA system which is robust to signal distortion must be considered.

BRIEF SUMMARY OF THE INVENTION

According to an aspect of the present invention, there is provided a wireless transceiver device employing the CS/CDMA method, which includes an encoder configured to execute error correction coding on data having a predetermined number of bits among data inputted from outside, and a code selector configured to select a code corresponding to the data subjected to correction coding. Here, the wireless transceiver device performs wireless communication by use of the data inputted from the outside excluding the data having the predetermined number of bits and by use of the code.

Meanwhile, according to another aspect of the present invention, there is provided a wireless transceiver device employing the CS/CDMA method, which includes a correlator configured to search for a code of received data inputted from the outside, a decoder configured to execute error correction on the received data subjected to code searching, and a recursive correlator configured to decode a last bit by use of the received data and the received data subjected to error correction.

Meanwhile, according to another aspect of the present invention, there is provided a wireless transceiver device employing the CS/CDMA method, which includes a correlator configured to search for a code having the highest correlation with received data inputted from outside and to output soft decision data corresponding to the code, and a decoder configured to execute error correction on the soft decision data and to output the data as decoded data and further to execute error correction coding on the decoded data and to output the data as correction parity data. Here, the correlator outputs a decoded beat by use of the received data, the decoded data, and the correction parity data.

Meanwhile, according to another aspect of the present invention, there is provided a wireless communication method employing the CS/CDMA method, which includes the steps of executing error correction coding on data having a predetermined number of bits among data inputted from outside, selecting a code corresponding to the data subjected to correction coding, and performing wireless communication by use of the data inputted from the outside excluding the data having the predetermined number of bits and by use of the code.

Meanwhile, according to another aspect of the present invention, there is provided a wireless communication method employing the CS/CDMA method, which includes the steps of searching for a code having the highest correlation with received data inputted from outside, outputting soft decision data corresponding to the code, executing error correction of the soft decision data and outputting the data as decoded data, executing error correction coding on the decoded data and outputting the data as correction parity data, and outputting a decoded beat by use of the received data, the decoded data, and the correction parity data.

DETAILED DESCRIPTION OF THE INVENTION

Figure 1:
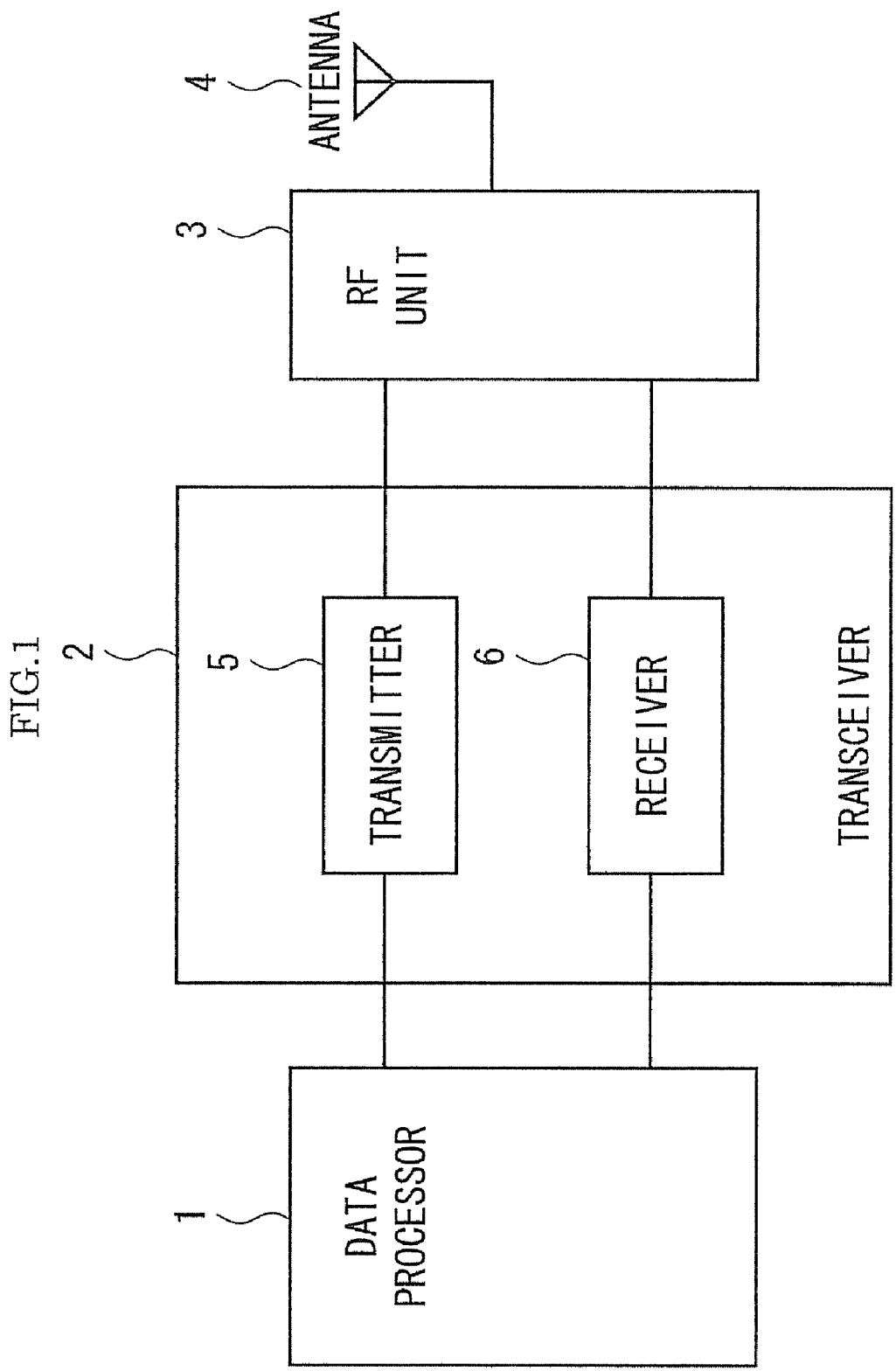
FIG. 1 is a view showing a wireless transceiver device according to a first embodiment of the present invention.

Now, first and second embodiments of the present invention will be described below with reference to the accompanying drawings. In the following description of the drawings in the first and second embodiment, identical or similar constituents are designated by identical or similar reference numerals.

First Embodiment

FIG. 1 is a view showing a wireless transceiver device according to a first embodiment of the present invention.

As shown in FIG. 1, this embodiment includes a data processor 1, a data transceiver 2, a RF (radio frequency) unit 3, and an antenna 4. The data transceiver 2 includes a transmitter 5 and a receiver 6.

The data processor 1 is connected to the transceiver 2. The data transceiver 2 is connected to the RF unit 3. The RF unit 3 is connected to the antenna 4.

The data processor 1 is a circuit for processing digital format data, such as a digital processor or a dedicated communication chip.

The transmitter 5 of the transceiver 2 is a circuit for converting digital format data inputted from the data processor 1 into data with a format suitable for wireless communication and outputting the data to the RF unit 3 as a transmission signal. Meanwhile, the receiver 6 of the transceiver 2 is a circuit for converting received data inputted from the RF unit 3 into digital format data and outputting the data to the digital processor 1. The transmitter 5 and the receiver 6 will be described later in detail.

The RF unit 3 is a circuit for processing a carrier wave for wireless communication. This is the circuit for superposing the transmission signal inputted from the transmitter 5 on the carrier wave and outputting the signal to the antenna 4, for example. Meanwhile, this is the circuit for removing a carrier wave component from data received from the antenna 4 and outputting the data to the receiver 6, for example.

Next, the transmitter 5 will be described with reference to FIG. 2.

Figure 2:
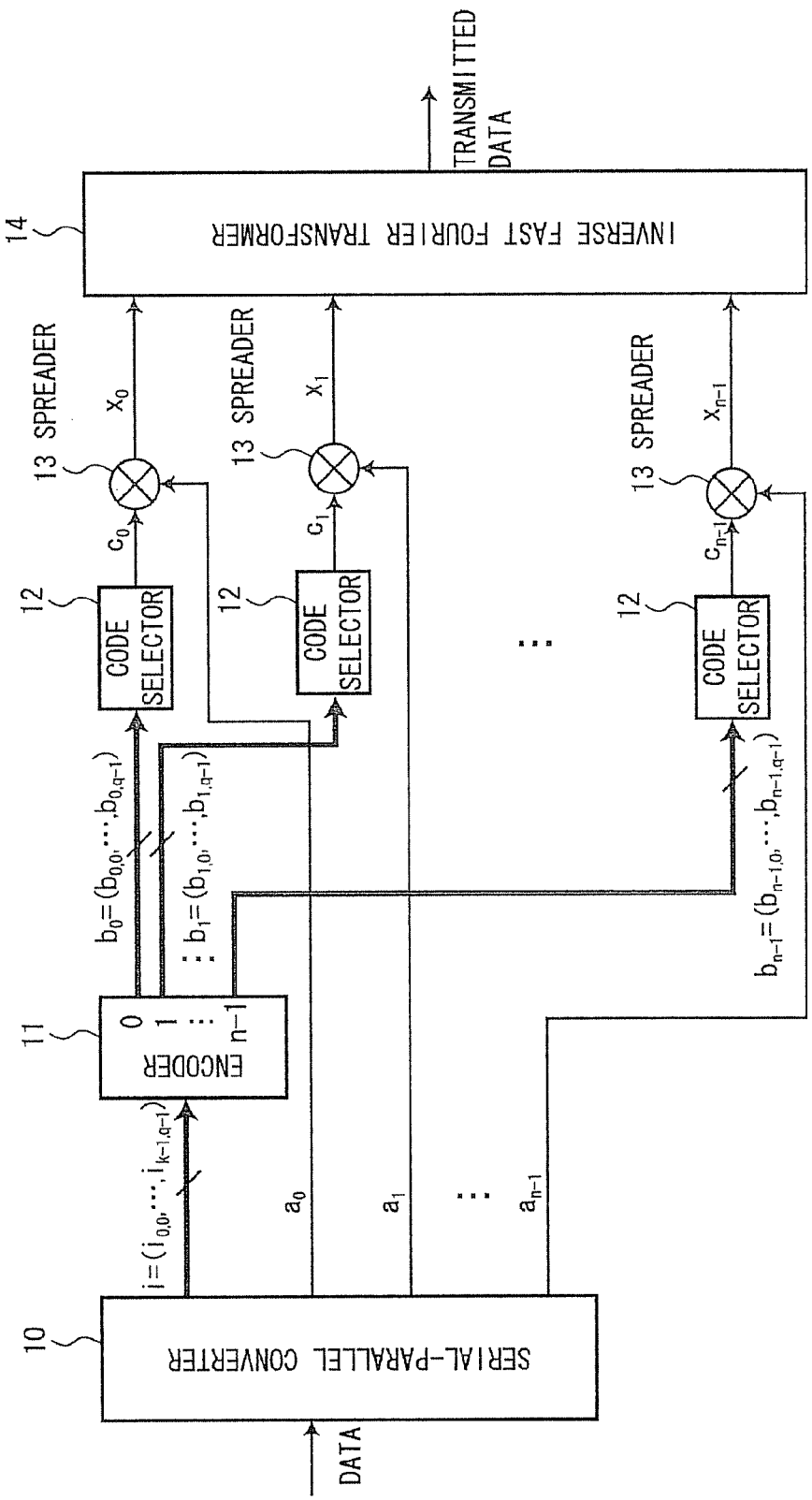
FIG. 2 is a block diagram showing a configuration of a transmitter of the first embodiment.

FIG. 2 is a block diagram showing a configuration of the transmitter 5. As shown in FIG. 2, the transmitter 5 includes a serial-parallel converter 10, an encoder 11, code selectors 12, spreaders 13, and an inverse fast Fourier transformer 14.

The serial-parallel converter 10 is connected to the data processor 1, the encoder 11, and the spreaders 13.

When this first embodiment is applied to the BPSK Modulation, the serial-parallel converter 10 rearranges binary information bit series data with a serial format and outputs the data as parallel format data. The binary information bit series are one-bit code series such as a sequence consisting of 0 and 1. First, in this embodiment, binary information bit series data having a predetermined number of bits equal to N are inputted from the data processor 1 to the serial-parallel converter 10. Certainly this method is varying with Modulation method (QPSK, for example), vary with Modulation Method.

This N is a value calculated by N=k*(q+1)+(n−k). The k is a number of blocks of bit series i to be described later. The q is a number of bits contained in each block in the bit series i. The n corresponds to n of (n, k) RS codes to be described later. Moreover, the number of orthogonal codes is determined in response to the q value. For example, when N=16 bit, q=3 and n=7, CODE SELECTOR number k is decided as 3. It is because that there are CODE SELECTORs need for parity symbol. On the other hand, in current system, N is equal to k*(q+1). So, when q=3, CODE SELECTOR number is 3. When q=4, CODE SELECTOR number is 4 as well.

Next, the parallel format data will be described. The serial-parallel converter 10 divides the inputted N bits of data into n sets of beat groups a (a=$a_0$ to $a_{n-1}$) and the bit series i which are equivalent to the remaining bits after subtracting the n sets of beat groups from the N and outputs the data. Each of the beat groups ranging from $a_0$ to $a_{n-1}$ has one bit. Accordingly, the bit series i have (N-n) bits. Meanwhile, the beat groups ranging from $a_0$ to $a_{n-1}$ are outputted to the spreaders 13. The bit series i are outputted to the encoder 11.

The bit series i are divided into a predetermined number of blocks equal to k. Moreover, each block has a predetermined number of bits equal to q. Meanwhile each single bit in the bit series i is indicated by $i_{s,t}$. Here, the s indicates the block and the t indicates a bit number in the block. The s is any of the numbers ranging from 0 to k−1. The t is any of the numbers ranging from 0 to q−1.

The encoder 11 executes error correction coding on the bit series i outputted from the serial-parallel converter 10 and outputs the data to the code selectors 12 as parity series b (b=$b_0$ to $b_{n-1}$). In this embodiment, RS (Reed-Solomon) coding on ($n=2^q$, k) configured to perform correction on the symbol basis is applied to error correction coding. Here, the symbol refers to a cluster of a predetermined number of bits. The n represents the number of symbols to be transmitted while the k represents the number of information symbols out of the symbols to be transmitted. In this case, the maximum error correction number E of (n, k) RS codes satisfies E=(n−k)/2. That is, it is possible to correct symbols errors up to E pieces.

There are n pieces of the code selectors 12 in total and any one of $b_0$ to $b_{n-1}$ out of the n pieces of the parity series b outputted from the encoder 11 is inputted to each of the code selectors 12. Each of the code selectors 12 selects an orthogonal code corresponding to the value of the parity series b and outputs the code as an orthogonal code c (c=$c_0$ to $c_{n-1}$) corresponding to any one of $b_0$ to $b_{n-1}$. Here, the orthogonal codes are numbers uniquely determined in response to inputs of the bits, which are binary information bit series having the number of bits equal to $2^q$ prepared in advance in this embodiment.

Any one of the orthogonal codes c (c=$c_0$ to $c_{n-1}$) and any one of the beat groups (a=$a_0$ to $a_{n-1}$) are inputted to and diffused in each of the spreaders 13, and the data are outputted as diffused data x (x=$x_0$ to $x_{n-1}$). The diffused data x are modulated by using any one of frequencies out of $n_{sub}$ pieces of sub-carriers and are then outputted.

All the diffused data x ranging from x0 to xn−1 are inputted from n pieces of the spreaders 13 to the inverse fast Fourier transformer 14, and the inverse fast Fourier transformer 14 executes inverse fast Fourier transform and outputs a single transmission signal to the RF unit.

As described above, the transmitter 5 firstly divides the N bits of the binary information series data into the beat groups a (a=$a_0$ to $a_{n-1}$) and the bit series i (i=$i_{0,0}$ to $i_{k-1,q-1}$). Next, the transmitter 5 executes error correction coding on the bit series i and outputs the parity bit series b (b=$b_0$ to $b_{n-1}$). Then, one of $2^q$ pieces of the orthogonal codes is selected for the parity bit series b and is outputted as the orthogonal code c (c=$c_0$ to $c_{n-1}$). Next, the orthogonal code c and the beat groups a are diffused and outputted as the diffused data x (x=$x_0$ to $x_{n-1}$). Then, the diffused data x are subjected to inverse fast Fourier transform and the transmission signal is outputted.

Above mentioned embodiment is applied for Multi-carrier system (for example, OFDM), furthermore, it is also possible to be applied for Multi-code system. In Multi-code system, INVERSE FAST FOURIER TRANSFORMER 14 becomes Summation, and FAST FOURIER TRANSFORMER 20 becomes Serial to Parallel Converter.

Next, the receiver 6 will be described with reference to FIG. 3 and FIG. 4.

Figure 3:
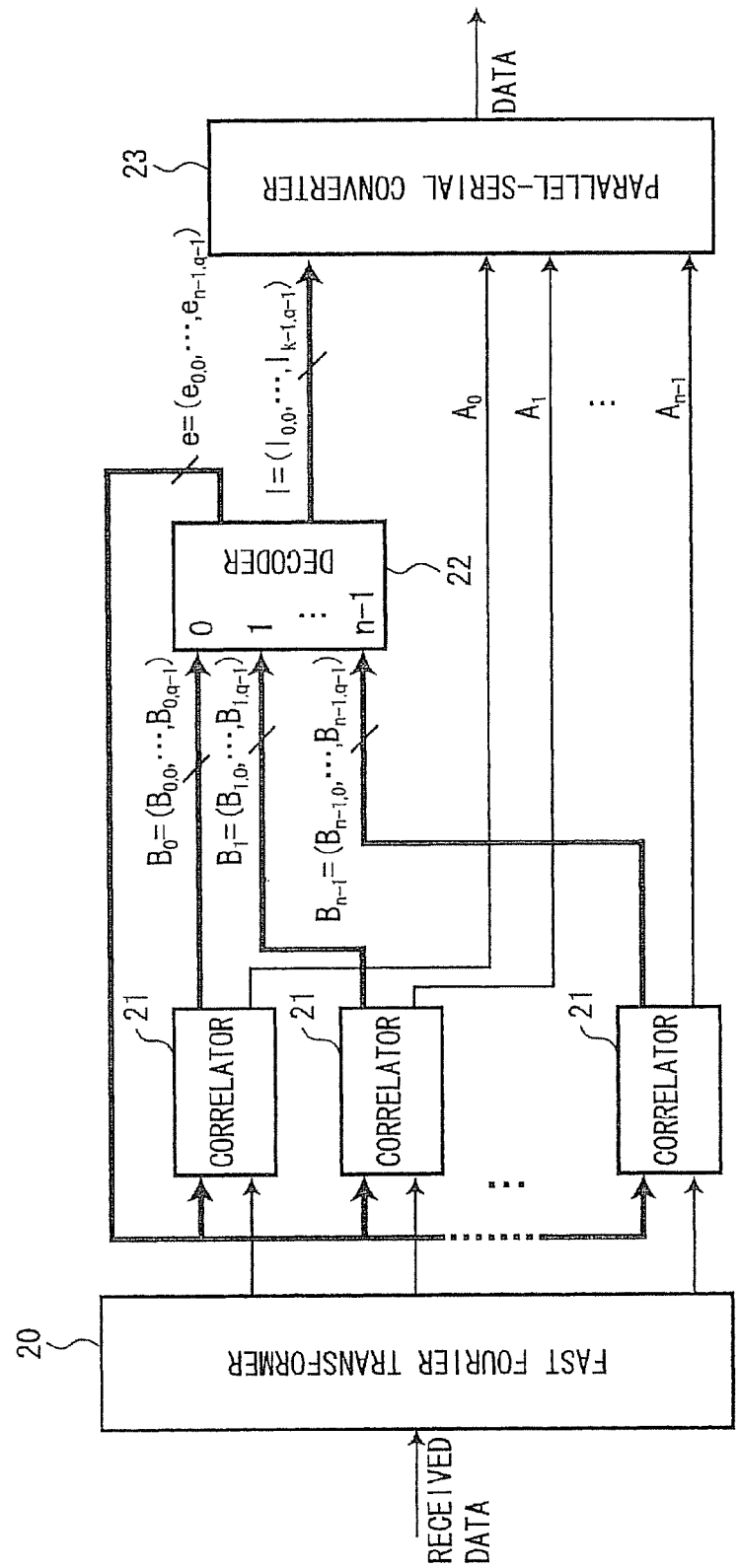
FIG. 3 is a block diagram showing a configuration of a receiver of the first embodiment.
Figure 4:
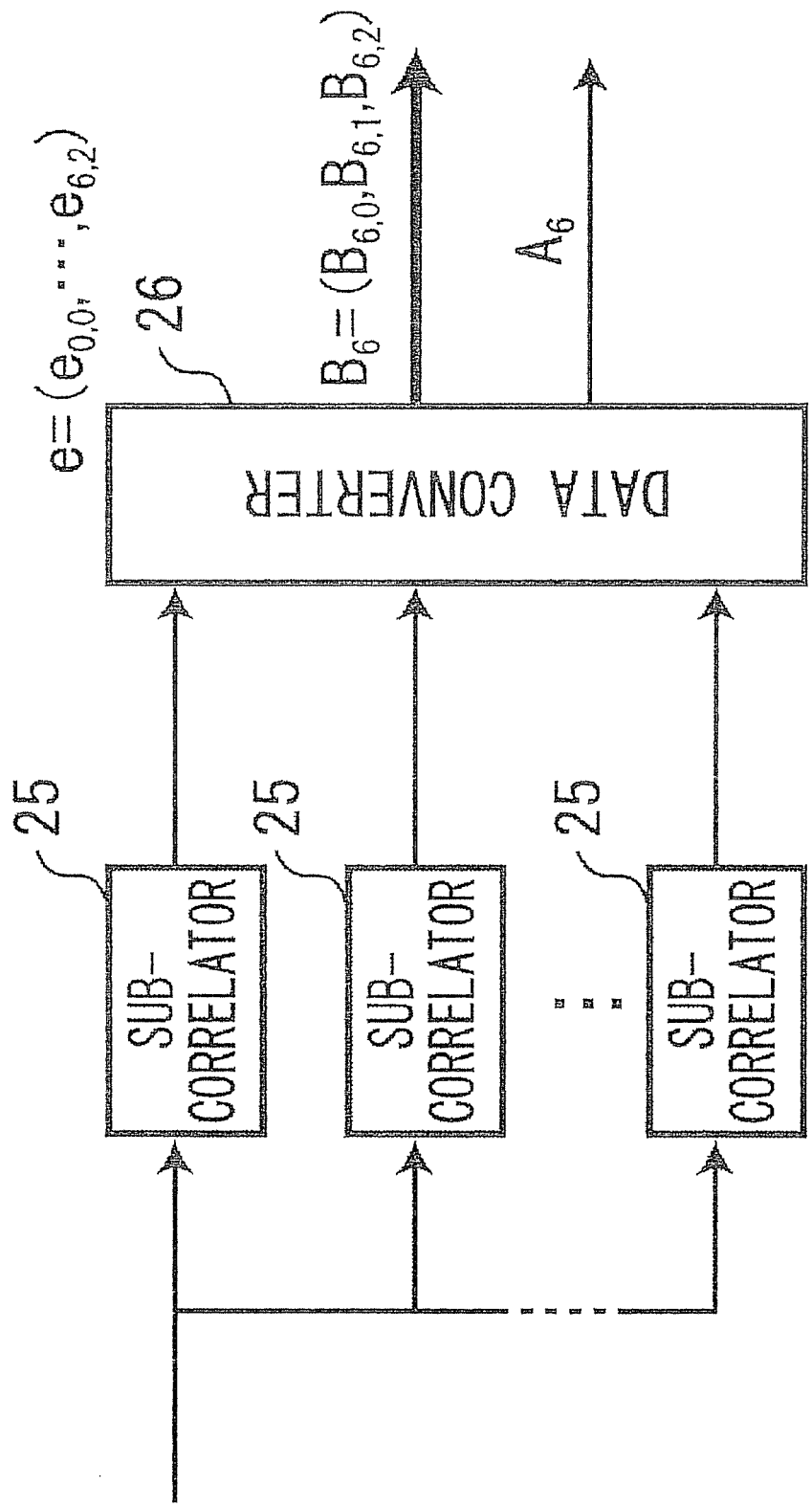
FIG. 4 is a block diagram showing a configuration of a correlator of the receiver.

FIG. 3 is a block diagram showing a configuration of the receiver 6. FIG. 4 is a block diagram showing a configuration of a correlator 21. As shown in FIG. 3, the receiver 6 includes a fast Fourier transformer 20, correlators 21, a decoder 22, and a parallel-serial converter 23. As shown in FIG. 4, the correlator 21 further includes sub-correlators 25 and a data converter 26.

The fast Fourier transformer 20 is connected to the RF unit 3 and the correlators 21. The fast Fourier transformer 20 executes fast Fourier transform on received data outputted from the RF unit 3 and outputs n pieces of data X (X=$X_0$ to $X_{n-1}$) to the correlators 21.

The correlators 21 are connected to the fast Fourier transformer 20, the decoder 22, and the parallel-serial converter 23. First, one of the data X outputted from the fast Fourier transformer 20 is inputted to each of the correlators 21. The correlator 21 executes inverse diffusion and outputs a soft decision series B (B=$B_{0,0}$ to $B_{n-1,q-1}$), which is the most likely bit series used for code selection at the time of transmission, to the decoder 22. This inverse diffusion is to output the bit series from the orthogonal code on the contrary to the above-described code selector 12. Procedures of this inverse diffusion are as follows. First, all correlations between the inputted data X and the orthogonal codes are calculated. Then, the bit series is outputted as the soft decision series B by use of the orthogonal bit having the highest correlation.

Next, the correlator 21 restore a decoded beat group A (A=$A_0$ to $A_{n-1}$) by use of one of the data X and a correction parity series e (e=$e_{0,0}$ to $e_{n-1,q-1}$), and outputs the data to the parallel-serial converter 23. This correction parity series e will be described later in detail.

The decoder 22 is connected to the correlators 21 and the parallel-serial converter 23. The decoder 22 executes decoding on error correction codes by use of the soft decision series B outputted from the correlators 21 and outputs decoded bit series I (I=$I_{0,0}$ to $I_{n-1,q-1}$) and the correction parity series e (e=$e_{0,0}$ to $e_{n-1,q-1}$). The decoded bit series I are outputted to the parallel-serial converter 23. Meanwhile, the correction parity series e are recursively outputted to the correlators 21.

The correction parity series e (e=$e_{0,0}$ to $e_{n-1,q-1}$) are values obtained by subjecting the decoded bit series I to RS coding. Specifically, though the soft decision series B may contain errors, such errors are corrected in the correction parity series e and the correction parity series e are likely to be more accurate values than the soft decision series B. Therefore, when restoring the decoded beat groups A, it is possible to improve a probability of restoring more accurate values by using the correction parity series e instead of using the soft decision series B.

The decoded bit series I outputted from the decoder 22 and the decoded beat groups A outputted from the correlators 21 are inputted to the parallel-serial converter 23 in parallel. The data are outputted to the data processor 1 as serial data and the binary information bit series are restored therefrom.

As described above, the receiver 6 executes fast Fourier transform on the received signal and divides the signal into n pieces of the data X (X=$X_0$ to $X_{n-1}$). Then, the receiver 6 executes inverse diffusion on the data X and outputs the soft decision series B (B=$B_{0,0}$ to $B_{n-1,q-1}$) used for code selection. Next, the receiver 6 subjects the soft decision series B to decoding of the error correction signals and outputs the decoded bit series I (I=$I_{0,0}$ to $I_{n-1,q-1}$) and the correction parity series e (e=$e_{0,0}$ to $e_{n-1,q-1}$). Then, the receiver 6 outputs the decoded beat groups A by utilizing the correlations between the recursively-used correction parity series e and the data X. Next, the receiver 6 restores the binary information bit series by use of the decoded bit series I and the decoded beat groups A.

In this embodiment, the encoder 11 carries out error correction coding before code selection by the code selectors 12 at the time of transmission. Accordingly, it is possible to correct errors of code selection at the time of reception and thereto achieve accurate reception. For example, even when an error of a transmission signal may occur due to a characteristic of a communication path in wireless communication, it is possible to correct such an error at the time of reception. Meanwhile, when transmitted data have a large number of bits, code selection errors at the time of reception may lead to errors of received data. However, this embodiment can correct such errors as well.

Moreover, this embodiment is configured to use the beat groups and is able to reduce the PAPR as compared to a configuration not using the beat groups.

To be more precise, assuming that input data consist of 16 bits and that the number of sub-carriers is equal to the PAPR, the PAPR is equal to 16 in a typical multi-carrier system (OFDM). In this embodiment, since there are seven CS blocks, the PAPR is 7. Thus, the PAPR is reduced from 16 to 7.

Meanwhile, in comparison with the conventional CS/CDMA method having four CS blocks, the PAPR becomes equal to 4 in the conventional CS/CDMA method. Although the PAPR is slightly increased in comparison with the conventional CS/CDMA method, this embodiment has an effect to improve a BER (bit error rate).

As described above, this embodiment can improve BER while moderating the increase in the PAPR.

Concrete Example of First Embodiment

Figure 5:
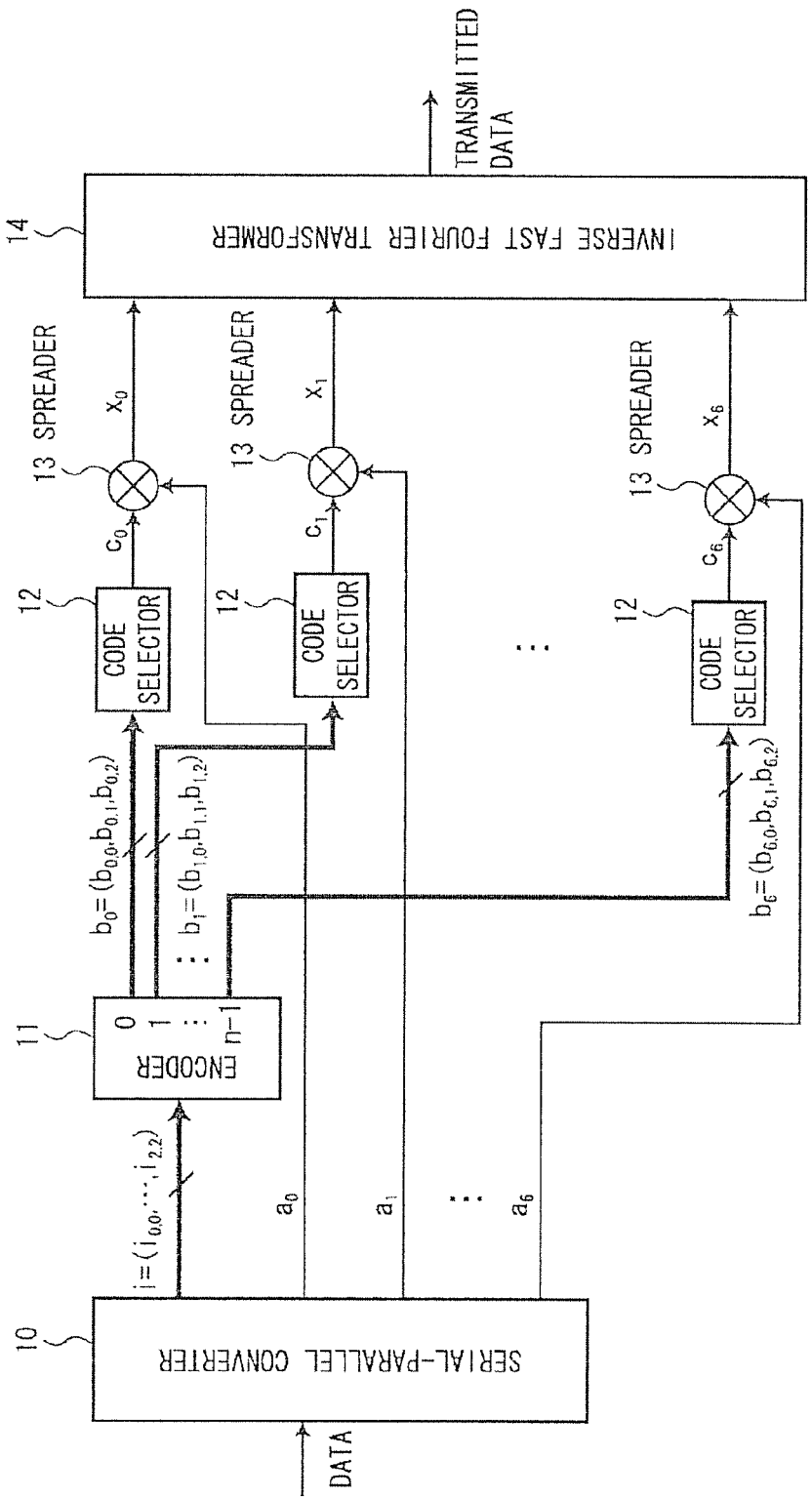
FIG. 5 is a view showing a concrete configuration of the transmitter of the first embodiment.
Figure 6:
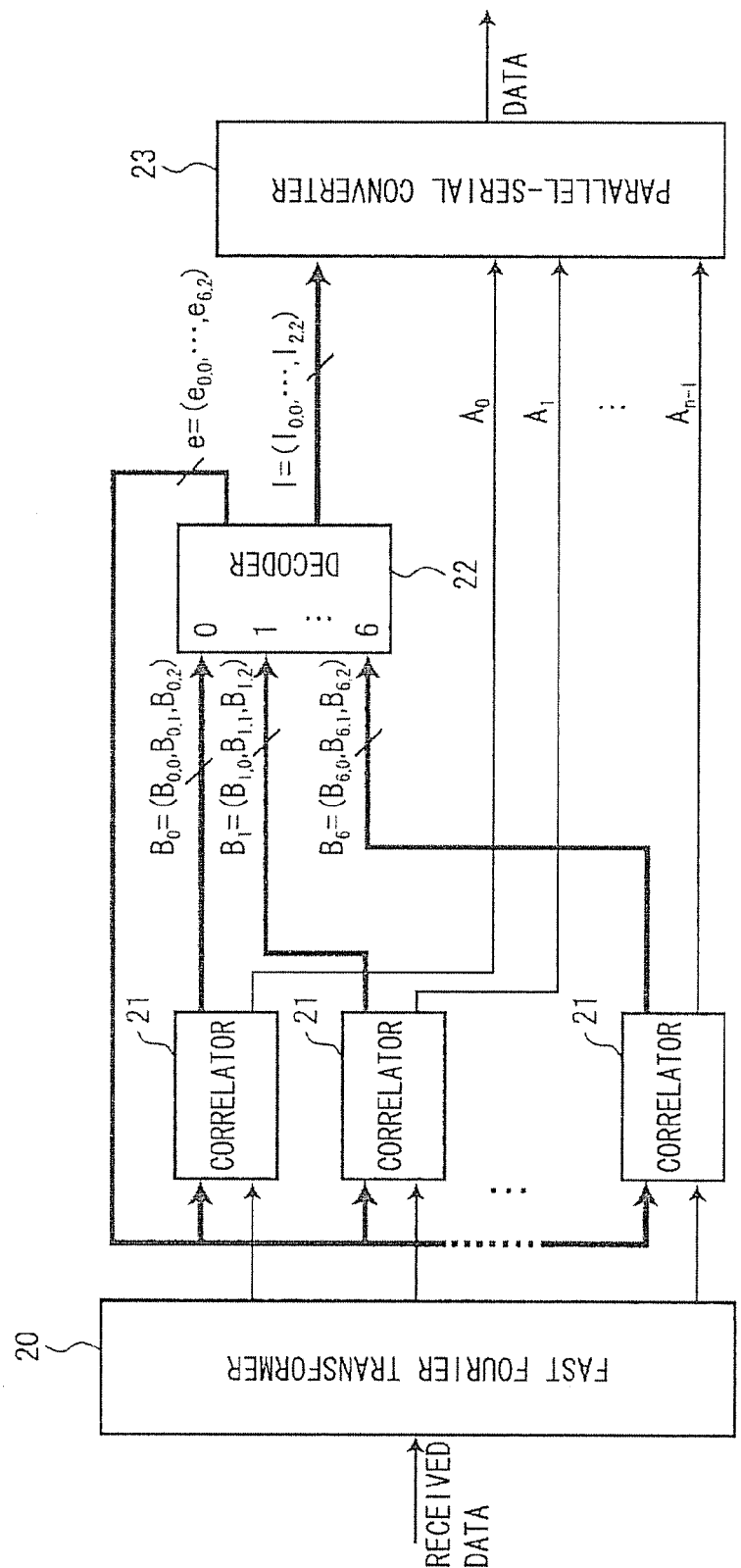
FIG. 6 is a view showing a concrete configuration of the receiver of the first embodiment.

Next, a concrete example of the first embodiment will be described with reference to FIG. 5 and FIG. 6. FIG. 5 shows a configuration of the transmitter 5 in the case where the encoder 11 applies (7, 3) RS coding. FIG. 6 shows a configuration of the receiver 6 corresponding to the transmitter in FIG. 5.

As shown in FIG. 5, the number of sub-carriers $n_{sub}$ is equal to 7. The input data consist of 16 bits ranging from $d_0$ to $d_{15}$.

First, an operation at the time of transmission will be described.

The serial-parallel converter 10 divides the input data into the bit series i and the beat groups a corresponding to $d_0=i_{0,0}$, $d_1=i_{0,1}$, $d_2=i_{0,2}$, $d_3=i_{1,0}$, $d_4=i_{1,1}$, $d_5=i_{1,2}$, $d_6=i_{2,0}$, $d_7=i_{2,1}$, $d_8=i_{2,2}$, $d_9=a_0$, $d_{10}=a_1$, $d_{11}=a_2$, $d_{12}=a_3$, $d_{13}=a_4$, $d_{14}=a_5$, and $d_{15}=a_6$. That is, the bit series i are divided into three groups each having 3 bits so as to correspond to $i_0=(i_{0,0}, i_{0,0}, i_{0,2})$, $i_1=(i_{1,0}, i_{1,1}, i_{1,2})$, and $i_2=(i_{2,0}, i_{2,1}, i_{2,2})$. The beat groups a are divided into 7 pieces in total ranging from $a_0$ to $a_6$.

Next, the encoder 11 executes (7, 3) RS encoding on the bit series i and outputs data having 7 transmission symbols for 3 information symbols. Specifically, the parity series including $b_0=i_0$, $b_1=i_1$, $b_2=i_2$, $b_3=p_3$, $b_4=p_4$, $b_5=p_5$, and $b_6=p_6$ are outputted according to the three bit series $i_0$, $i_1$, and $i_2$. Here, $p_3$ to $p_6$ are added symbols.

Next, the code selectors 12 select the orthogonal codes c by use of the parity series b. An orthogonal code having $2^3=8$ bits is selected for three bits of $b_0$ and is outputted as the orthogonal code $c_0$. Similarly, $c_1$ is outputted for $b_1$, $c_1$ is outputted for $b_1$, $c_2$ is outputted for $b_2$, $c_3$ is outputted for $b_3$, $c_4$ is outputted for $b_4$, $c_5$ is outputted for $b_5$, and $c_6$ is outputted for $b_6$.

Next, the spreaders 13 diffuse the orthogonal codes c and the beat groups a and output the diffused data x. For the $c_0$ having 8 bits, the diffused data $x_0$ having the same 8 bits are outputted. Similarly, $x_1$ are outputted for $c_1$, $x_2$ are outputted for $c_2$, $x_3$ are outputted for $c_3$, $x_4$ are outputted for $c_4$, $x_5$ are outputted for $c_5$, and $x_6$ are outputted for $c_6$.

Next, the inverse fast Fourier transformer 14 executes inverse fast Fourier transform on the diffused data x and outputs the data as a single transmission signal.

Subsequently, an operation at the time of reception will be described.

The fast Fourier transformer 20 executes fast Fourier transform on the received signal and divides the signal into 7 pieces of the data X. Each piece of the data X has 8 bits.

Next, the data X are inputted to the correlators 21 and the soft decision series B are outputted therefrom. Here, the soft decision series $B_0$ having 3 bits is outputted for $X_0$ having 8 bits. Similarly, $B_1$ is outputted for $X_1$, $B_1$ is outputted for $X_1$, $B_2$ is outputted for $X_2$, $B_3$ is outputted for $X_3$, $B_4$ is outputted for $X_4$, $B_5$ is outputted for $X_5$, and $B_6$ is outputted for $X_6$.

Next, the decoder 22 executes decoding on the soft decision series B and outputs the decoded bit series I and the correction parity series e. Here, three groups of the decoded bit series I and seven groups of the correction parity series e are outputted from seven groups of the soft decision series B. Specifically, $I_0=(I_{0,0}, I_{0,1}, I_{0,2})$, $I_1=(I_{1,0}, I_{1,1}, I_{1,2})$, and $I_2=(I_{2,0}, I_{2,1}, I_{2,2})$ are outputted as the decoded bit series I. Meanwhile, $e_0=(e_{0,0}, e_{0,1}, e_{0,2})$, $e_1=(e_{1,0}, e_{1,1}, e_{1,2})$, $e_2=(e_{2,0}, e_{2,1}, e_{2,2})$, $e_3=(e_{3,0}, e_{3,1}, e_{3,2})$, $e_4=(e_{4,0}, e_{4,1}, e_{4,2})$, $e_0=(e_{5,0}, e_{5,1}, e_{5,2})$, and $e_6=(e_{6,0}, e_{6,1}, e_{6,2})$ are outputted as the correction parity series e.

Next, the correction parity series e are inputted to the correlators 21 and the decoded beat groups A are outputted therefrom. Here, $A_0$ is outputted for $e_0$. Similarly, $A_1$ is outputted for $e_1$, $A_2$ is outputted for $e_2$, $A_3$ is outputted for $e_3$, $A_4$ is outputted for $e_4$, $A_5$ is outputted for $e_5$, and $A_6$ is outputted for $e_6$.

Next, the parallel-serial converter 23 serially outputs the received data D consisting of 16 bits by use of the decoded bit series I and the decoded beat groups A. Specifically, the received data D are outputted so as to correspond to $D_0=I_{0,0}$, $D_1=I_{0,1}$, $D_2=I_{0,2}$, $D_3=I_{1,0}$, $D_4=I_{1,1}$, $D_5=I_{1,2}$, $D_6=I_{2,0}$, $D_7=I_{2,1}$, $D_8=I_{2,2}$, $D_9=A_0$, $D_{10}=A_1$, $D_{11}=A_2$, $D_{12}=A_3$, $D_{13}=A_4$, $D_{14}=A_5$, and $D_{15}=A_6$.

Although this embodiment has been described by use of concrete numbers, other numbers are also applicable thereto.

Second Embodiment

A second embodiment of the present invention will be described with reference to FIG. 7.

Figure 7:
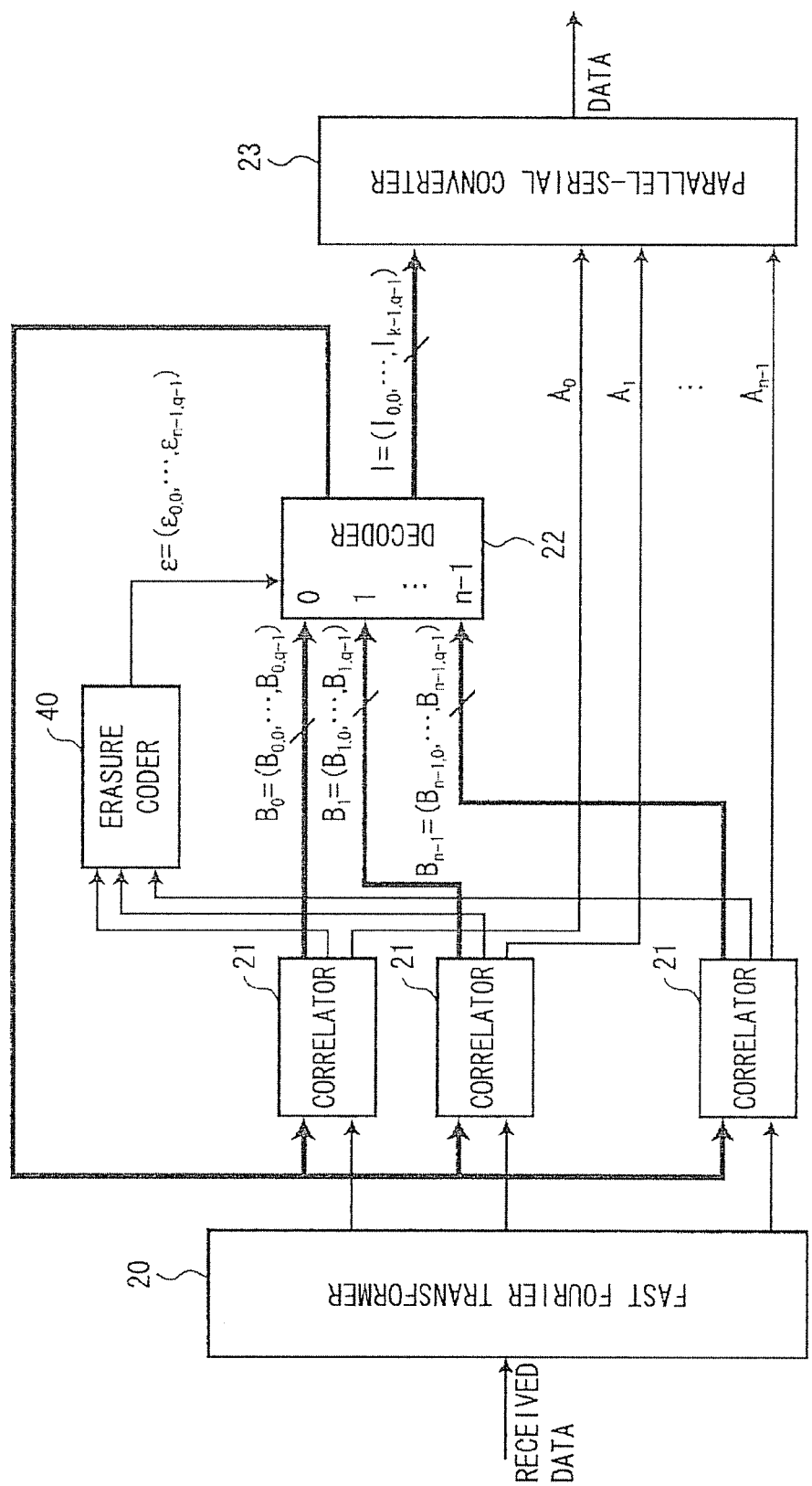
FIG. 7 is a block diagram showing a configuration of a receiver of a second embodiment.

FIG. 7 shows a block diagram showing a configuration of the receiver 6 shown in FIG. 3 with addition of an erasure encoder 40. Other features are similar to those in the first embodiment and duplicate explanation will therefore be omitted.

The correlators 21 output correlation coefficients $\delta(\delta=\delta_0$ to $\delta_{n-1})$ to the erasure encoder 40. The correlation coefficients $\delta$ are binary information bit series having the number of bits equal to $2^n$.

The erasure encoder 40 determines a certain threshold and specifies erased positions according to the correlation coefficients $\delta$, and then outputs erased portions $\epsilon(\epsilon=\epsilon_{0,0}$ to $\epsilon_{n-1,q-1})$. Here, the erased positions are determined after a continuous process of trial and error. Note that a relation $\epsilon=r-q$ is satisfied herein.

The decoder 22 specifies positions; which are to be corrected, according to the erased portions $\epsilon$ outputted from the erasure encoder 40 and decodes the soft decision series B.

In this embodiment, the erasure encoder 40 is added to the configuration of the first embodiment. In RS coding, the correctable number of erased symbols exceeds that of erroneous symbols. Consequently, in this embodiment, the correctable number symbols are increased as compared to the first embodiment. Accordingly, it is possible to reduce code selection errors more efficiently than the first embodiment even when using the same RS codes as those in the first embodiment.

Concrete Example of Second Embodiment

Figure 8:
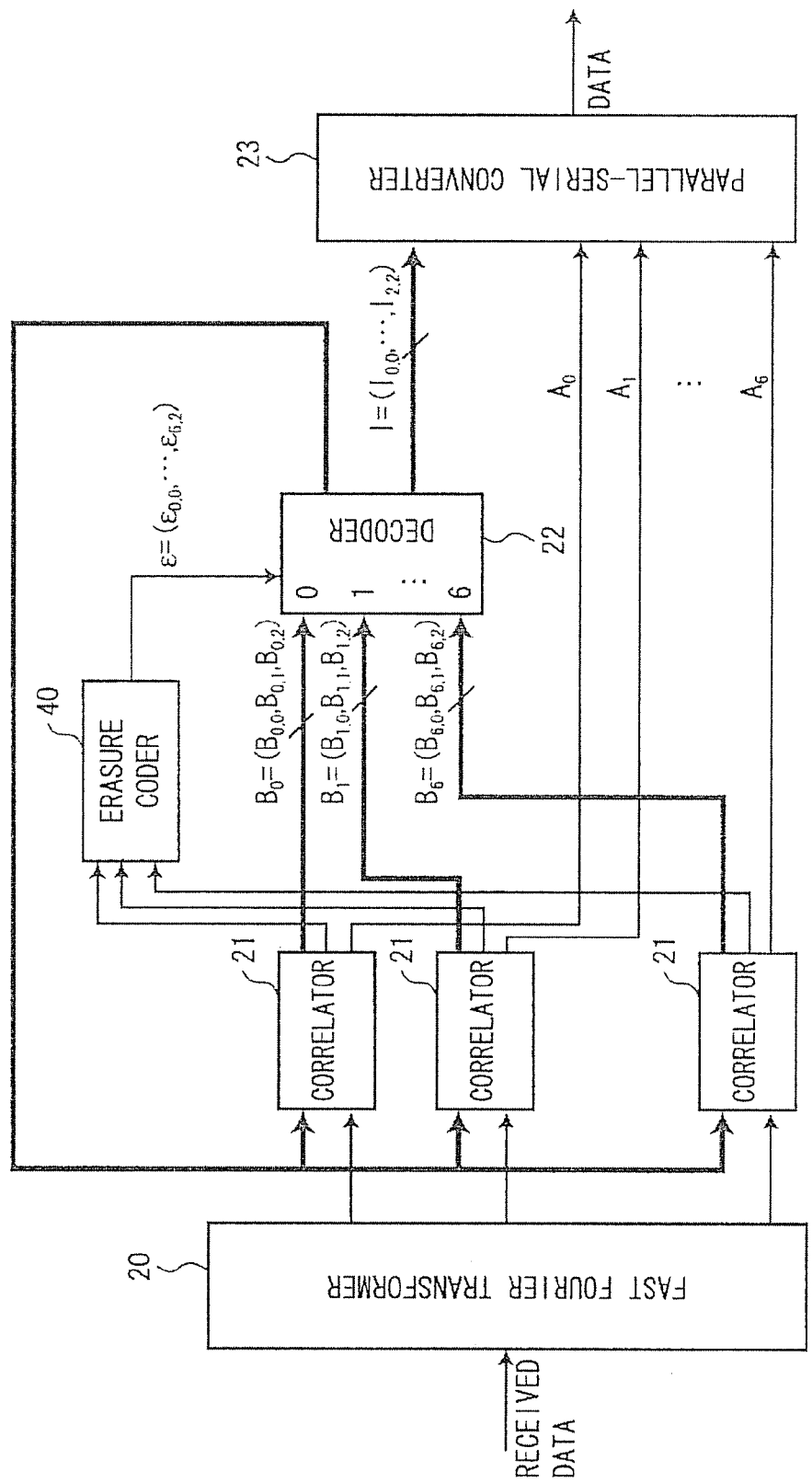
FIG. 8 is a view showing a concrete configuration of the receiver of the second embodiment.

FIG. 8 is a view showing an embodiment which employs (7, 3) RS erasure decoding to the embodiment shown in FIG. 7.

This example is similar to the concrete example of the first embodiment except addition of the erasure encoder 40, and duplicate explanation will therefore be omitted.

The correlators 21 output the correlation coefficients $\delta(\delta=\delta_0$ to $\delta_6)$ to the erasure encoder 40.

The erasure encoder 40 outputs the erased portion $\epsilon_0=(\epsilon_{0,0}, \epsilon_{0,1}, \epsilon_{0,2})$ according to the correlation coefficient $\delta_0$. Similarly, $\epsilon_1=(\epsilon_{1,0}, \epsilon_{1,1}, \epsilon_{1,2})$ is outputted for the correlation coefficient $\delta_1$, $\epsilon_{2,1}=(\epsilon_{2,0}, \epsilon_{2,1}, \epsilon_{2,2})$ is outputted for the correlation coefficient $\delta_2$, $\delta_3=(\epsilon_{3,0}, \epsilon_{3,1}, \epsilon_{3,2})$ is outputted for the correlation coefficient $\delta_3$, $\epsilon_4=(\epsilon_{4,0}, \epsilon_{4,1}, \epsilon_{4,2})$ is outputted for the correlation coefficient $\delta_4$, $\epsilon_5=(\epsilon_{5,0}, \epsilon_{5,1}, \epsilon_{5,2})$ is outputted for the correlation coefficient $\delta_5$, and $\epsilon_6=(\epsilon_{6,0}, \epsilon_{6,1}, \epsilon_{6,2})$ is outputted for the correlation coefficient $\delta_6$.

Although this embodiment has been described by use of concrete numbers, other numbers are also applicable thereto.

Other Embodiments

Although the above-described embodiments apply RS coding to the encoder 11, it is also possible to employ other error correction coding methods.

Although the embodiments employ inverse fast Fourier transform and fast Fourier transform, it is also possible to employ other applications.

The present invention has been described with reference to the first and second embodiments. However, the description and the drawings constituting part of this disclosure will not limit the scope of this invention. It is obvious to those skilled in the art that various other embodiments, examples, and technical applications are possible from the teachings of this disclosure.

Accordingly, it is to be understood that the present invention encompasses various other embodiments which are not expressly stated herein. In this context, the present invention shall be solely determined by the matter to define the invention relevant to the appended claims that deem to be appropriate in conjunction with this disclosure.

What is claimed is:

1. A wireless transceiver device employing a code select code division multiple access method, comprising:
   a correlator configured to search for code having the highest correlation with a piece of received data inputted from outside and to output soft decision data corresponding to the code;
   a decoder configured to execute error correction on the soft decision data thereby outputting the data as decoded data, and further configured to execute error correction coding on the decoded data, thereby outputting the data as correction parity data; and
   an erasure unit configured to specify a position to be subjected to error correction by applying erasure error decoding to the soft decision data,
   wherein the correlator outputs a decoded beat by use of the received data, the decoded data, and the correction parity data.

2. A wireless transceiver device employing a code select code division multiple access method, comprising:
   a fast Fourier transformer configured to execute fast Fourier transforms on data inputted from outside and to output n pieces of data;
   n pieces of correlator configured to execute inverse diffusion on the n pieces of data, to search for code having the highest correlation with a piece of the n pieces of data and to output soft decision data corresponding to the code, each soft decision data having q bits;
   a decoder configured to execute error correction on the soft decision data thereby outputting the data as decoded data, and further configured to execute error correction coding on the decoded data, thereby outputting the data as correction parity data; and
   an erasure unit configured to specify a position to be subjected to error correction by applying erasure error decoding to the soft decision data,
   wherein the correlator outputs a decoded beat by use of the received data, the decoded data, and the correction parity data.

3. A wireless transceiver device employing a code select code division multiple access method, comprising:
   a fast Fourier transformer configured to execute fast Fourier transforms on data inputted from outside and to output n pieces of data;
   n pieces of correlator configured to execute inverse diffusion on the n pieces of data, to search for a code having the highest correlation with a piece of the n pieces of data and to output soft decision data corresponding to the code, each soft decision data having q bits,
   a decoder configured to execute error correction on the soft decision data thereby outputting the data as decoded data, and further configured to execute error correction coding on the decoded data, thereby outputting the data as correction parity data; and
   an erasure unit configured to specify a position to be subjected to error correction by applying erasure error decoding to the soft decision data,
   wherein the correlator outputs a decoded beat by use of the received data, the decoded data, and the correction parity data, and
   wherein each of the n pieces of correlator further comprise a plurality of sub-correlators configured to calculate the orthogonal code and beat group from the data.

* * * * *